March 17, 1970  C. FELDMAN  3,500,649
WINE STORAGE CHEST
Filed May 10, 1968

INVENTOR
CHARLES FELDMAN

BY Larson and Taylor
ATTORNEYS

United States Patent Office 3,500,649
Patented Mar. 17, 1970

3,500,649
WINE STORAGE CHEST
Charles Feldman, 7400 Rebecca Drive,
Alexandria, Va. 22307
Filed May 10, 1968, Ser. No. 728,132
Int. Cl. F25b 21/02; F25d 25/02
U.S. Cl. 62—3                                12 Claims

ABSTRACT OF THE DISCLOSURE

A wine storage chest includes a thermoelectric panel for maintaining stored wine at a predetermined temperature. An inner wall located behind an outer door provides, a heat barrier when the door is open. Removable plugs located in the inner wall provide access to individual wine bottles as well as information regarding the wine lying therebehind.

Field of the invention

The present invention relates to a controlled cooling device for wine.

Background of the invention

To maintain wines in good condition it is required that the temperature of the wines be generally maintained at a certain acceptable level. Wines in general should be maintained at a temperature somewhat below normal room temperature with 55° F. being suggested as an appropriate temperature by some experts. The storage and maintenance of wine at such a temperature is a particular problem in apartments where a suitably cool place may not be available and where changes in temperature due to changes in heat regulation are relatively common, although similar problems exist in homes as well.

Summary of the invention

In accordance with the present invention a thermoelectric wine storage chest is provided which provides wine storage at a controlled temperature.

In accordance with a presently preferred embodiment of the invention the chest is provided with thermoelectric means preferably in the form of a thermoelectric panel having heat exchange vanes or fins. The chest further comprises a relatively light-impervious, moisture-tight cabinet, constructed of styrofoam or a like material, which includes an open rack arrangement mounted therein for supporting the wine bottles. Access to the bottles may be had through an outer hinged door on the cabinet and through removable plugs located in an inner wall located behind and facing the hinged roor. An individual plug is provided for each bottle and these plugs serve in maintaining the chest in a reasonably moisture tight condition as well as in providing a ready indication of the type of wine lying therebehind. In addition to a label provided thereon specifically identifying the wines, the plugs may be colored or otherwise marked such that the positioning of a predetermined color or mark in a preselected position may be used to identify a selected characteristic of the wine lying behind the plug, e.g., whether the wine is a red or white wine.

Other featuers and advantages of the invention not specifically enumerated will be set forth in or will become apparent upon consideration of the detailed description of the invention found hereinbelow.

Description of the preferred embodiment

Figure 1:
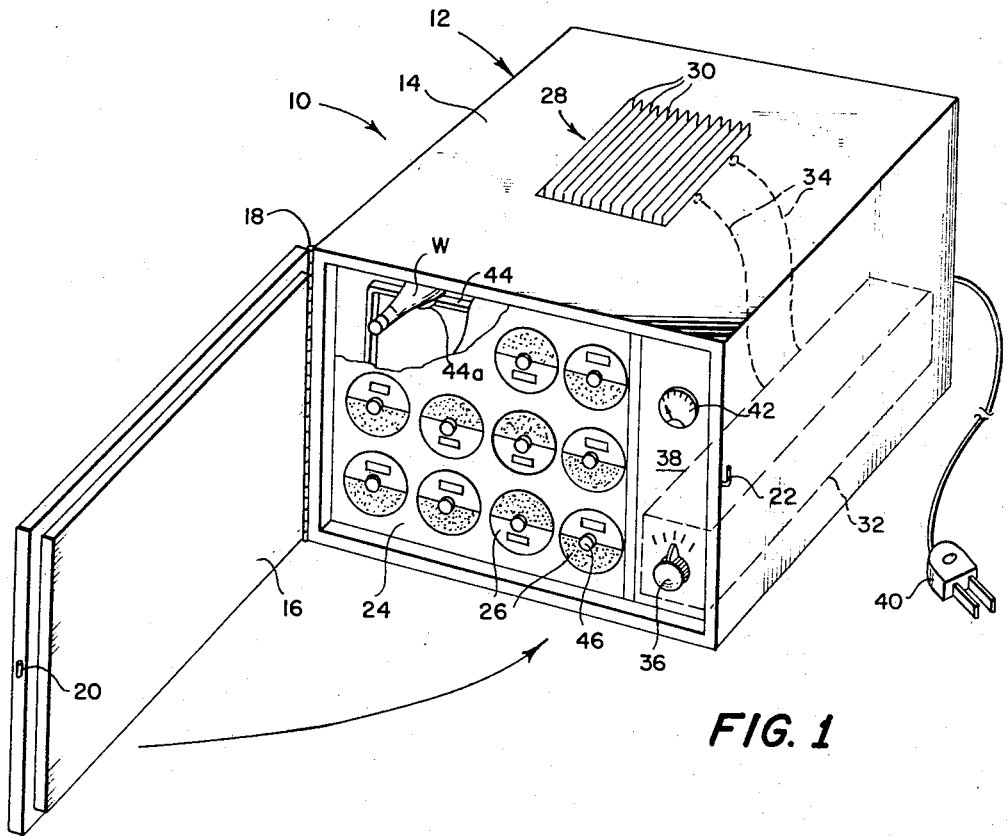
FIGURE 1 is a perspective view of a presently preferred embodiment of the storage chest invention partially broken away to show the position of the wine behind the inner wall of the chest.
Figures 2, 3:
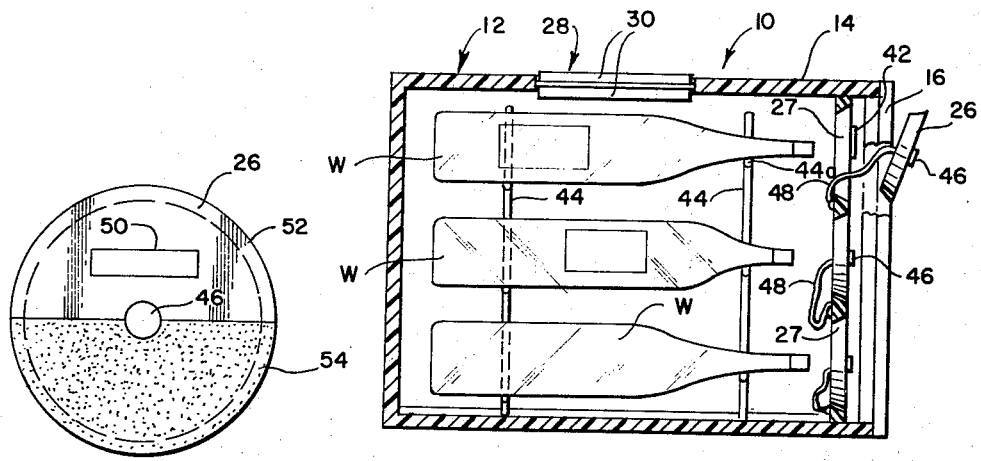
FIGURE 2 is a side elevational sectional view of the chest of FIGURE 1.
FIGURE 3 is a detail view to an enlarged scale of a removable plug for the inner wall of the chest of FIGURES 1 and 2.

Referring to FIGURE 1 there is shown a wine storage chest generally denoted 10 in accordance with a presently preferred embodiment of the invention. Chest 10 includes cabinet 12 which comprises a box-like enclosure 14 having an outer door 16 hinged at hinge 18. Door 16 may be firmly closed through a conventional door catch arrangement indicated by catch members 20 and 22. Chest 10 includes an inner wall 24 which provides a heat barrier when door 16 is open and through which access to wine bottles denoted W lying therebehind may be had. A series of removable plugs 26 located in openings 27 (best seen in FIGURE 2) in wall 24 provide access to individual bottles of wine, a bottle of wine W, when the chest 10 is full, lying behind each of the plugs. Thus an individual wine bottle may be removed without opening the entire inner wall 24 and hence the temperature within the chest 10 may be more easily maintained at a constant value.

Regulation of the temperature of the chest 10 is effected through control of a thermoelectric cooling panel 28. Panel 28 includes a series of heat exchange fins or vanes 30 which aid in carrying away heat. The cooling panel 28 which is of generally conventional construction is controlled through a control unit 32 and is connected thereto by leads 34. Control unit 32 preferably includes a potentiometer or rheostat (not shown) the setting of which is controlled through a knob 36 located on front control panel 38 adjacent inner wall 24. It is noted that a rheostat may be quite simple in form and that rheostats are available for light dimmers in homes. The unit 32 also preferably includes a transformer (not shown) for stepping down the 110 volt AC line voltage, obtained by plugging in wall plug 40, to a useable value, which, for example, may be from two to eight volts. With this arrangement the potentiometer may be used to control the voltage to the transformer primary although it is noted that control knob 36 is actually intended to be used quite infrequently in that the temperature of the chest 10 should be maintained at about 55° F. plus or minus 5° F. depending on the location in the house of the chest 10. Finally, control unit 32 preferably includes a rectifier arrangement (not shown) such as a conventional four-diode rectifier bridge for rectifying the AC output of the transformer. The output of the rectifier arrangement is connected through lead wires 34 to cooling panel 28. The front control panel 38 includes a thermometer 42 for providing an indication of the temperature within the chest 10. For efficiency of the thermoelectric panel, a choke or filter could be added in the rectifier circuit to limit the ripple at the DC output.

The individual wine bottles W are supported in individual recessed sections 44a of an open wire support rack 44. Frame 44 is preferably constructed of plated steel or aluminum and is positioned with cabinet 14 such that bottles W are readily accessible after plugs 26 are removed.

Plugs 26 are beveled in cross section (see FIGURE 2) and each includes a knob member 46 which enables removal of the plugs 26 from wall openings 27. The plugs 26 are each connected to wall 24 through an elongate resilient member 48 such as a cord so that possible loss of the plugs 26 upon removal is prevented. Plugs 26 in addition to providing individual access to wine bottles W may so serve to provide information such as the date, etc., regarding the wine lying therebehind. Specifically, labels containing indentifying information for the wines may affixed to the outer front surface of the plugs 26. Additionally, a general indication as to a preselected characteristic may be provided by the angular position of the ugs 26. For example, the plugs 26 may include two portions of different colors as indicated at 50 and 52 of FIGURE 3. These two colors are preferably red and white corresponding to red and white wines and thus the angular position of a plug, which will determine which color is positioned uppermost, may be used to indicate whether a red or white wine lies behind that plug. Further, a half-rotation of a plug may be used to indicate that a rosé wine lies therebehind.

The cabinet 12 is preferably constructed of material ich as polyfoam plastic and the inner surfaces of the alls are preferably lined and sprayed to make them aterproof. Waterproofing of the chest is important in providing humidity control for the corks in the wine bottles. The plugs 26 may be similarly constructed of polyfoam or styrofoam plastic and are preferably from ¾ in. to 1 in. in thickness which is the approximate preferred tickness of the walls of the cabinet 14. Inner wall 24 may be removed for cleaning purposes.

It is noted that the storage chest 10 has been described as a cooler but it will be understood that where the temperature of the location at which the chest is to be used less than 55° F. the thermoelectric panel may, with suitable adjustments, be used to supply heat. If the chest used in an area with widely varying temperatures, it may be necessary to include in the control unit an automatic thermostat to maintain the proper temperature. his thermostat may be a conventional type such as a bimetallic element.

Although the invention has been described in some detail with reference to a presently preferred embodiment ereof it will be understood that modifications other than ose specifically enumerated may be effected without departing from the scope and spirit of the invention. Thus e scope of the invention is to be determined not from e illustrative embodiment described hereinbefore but ither from the subjoined claims.

Having described my invention in accordance with the requirements of the patent statutes, I claim.

1. A wine storage chest comprising a cabinet constructed of insulating material, rack means located within said cabinet for supporting bottles of wine, and thermoelectric means comprising a thermoelectric panel located at one wall of said cabinet for controlling and maintaining the temperature of wine stored within said cabinet, said cabinet including an outer door and an inner wall facing said outer door, said inner wall including a plurality of apertures and plug members located in said apertures for permitting access to individual of the wine bottles.

2. A wine storage chest in accordance with claim 1 wherein each of said removable plug members are beveled in cross section and are individually fixed attached to a portion of said inner wall by elongate flexible means which permit removal of said plug members from said apertures without permitting separation of said plug members from said wall.

3. A wine storage chest in accordance with claim 1 wherein said plug members are removably mounted in said inner wall such that the position of the plug members with respect to a reference position may be varied, said plug members including indicating means thereon such that positioning of said plug members in a preselected position provides an indication of a predetermined characteristic of the wine located therebehind.

4. A wine storage chest in accordance with claim 3 wherein said indicating means located on said plug members comprises a two color indicia, said two colors being red and white corresponding to red and white wines respectively.

5. A wine storage chest in accordance with claim 1 wherein said thermoelectric means includes means located on the face of said inner wall for adjusting the temperature within said cabinet.

6. A wine storage chest in accordance with claim 1 wherein said rack means comprises an open wire rack constructed of a plated metal.

7. A wine storage chest in accordance with claim 1 wherein said cabinet is constructed of styrofoam and is light-impervious.

8. A wine storage chest in accordance with claim 1 wherein said cabinet is of moisture tight construction to provide humidity control for the corks in the wine bottles.

9. A wine storage chest in accordance with claim 1 wherein said thermoelectric means includes means located in the cabinet for automatically maintaining the temperature.

10. A wine storage chest comprising a cabinet constructed of insulating material and a rack arrangement located within said cabinet for supporting individual bottles of wine in spaced relationship to one another, said cabinet including an outer door for permitting access to the interior of said cabinet and an interior wall facing said outer door and forming a closed compartment with the remaining walls of said cabinet, said inner wall including a plurality of apertures therein, each of said apertures permitting access to individual bottles of wine stored in said rack arrangement behind said inner wall, and a corresponding plurality of plug members received in said apertures and individually removable therefrom so that in order to remove an individual bottle of wine only a single plug member need be removed.

11. A wine storage chest as claimed in claim 10 wherein each of said removable plug members are beveled in cross section and are individually fixedly attached to a portion of said inner wall by elongate flexible means which permit removal of said plug members from said apertures without permitting separation of said plug members from said wall.

12. A wine storage chest as claimed in claim 10 wherein said plug members are removably mounted in said inner wall such that the position of the plug members with respect to a reference position may be varied, said plug members including indicating means thereon such that the positioning of said plug members in a preselected position provides an indication of a predetermined characteristic of the wine located therebehind.

References Cited

UNITED STATES PATENTS

| | | | |
|---|---|---|---|
| 1,975,046 | 9/1934 | Larkin | 312—36 X |
| 3,078,682 | 2/1963 | Gould | 62—3 |
| 3,178,896 | 4/1965 | Sandsto | 62—3 |

WILLIAM J. WYE, Primary Examiner

U.S. Cl. X.R.

221—150, 286; 312—36, 291